(12) United States Patent
Elkins et al.

(10) Patent No.: US 8,317,035 B2
(45) Date of Patent: Nov. 27, 2012

(54) DEBRIS FILTER

(75) Inventors: Robert Bruce Elkins, Wilmington, NC (US); Richard Carl Longren, Wilmington, NC (US)

(73) Assignee: Global Nuclear Fuel-Americas, LLC., Wilmington, NC (US)

( * ) Notice: Subject to any disclaimer, the term of this patent is extended or adjusted under 35 U.S.C. 154(b) by 1692 days.

(21) Appl. No.: 11/024,953

(22) Filed: Dec. 30, 2004

(65) Prior Publication Data

US 2006/0283790 A1  Dec. 21, 2006

(51) Int. Cl.
  *B01D 46/10* (2006.01)
  *B01D 29/07* (2006.01)
  *G21C 19/04* (2006.01)

(52) U.S. Cl. ........ 210/521; 210/335; 210/489; 210/477; 376/313; 376/352; 376/434; 376/409

(58) Field of Classification Search .................. 210/335, 210/521
  See application file for complete search history.

(56) References Cited

U.S. PATENT DOCUMENTS

| | | | |
|---|---|---|---|
| 3,113,102 A * | 12/1963 | Schulze | 210/150 |
| 5,030,412 A | 7/1991 | Yates et al. | |
| 5,112,570 A | 5/1992 | Dix et al. | |
| 5,219,517 A | 6/1993 | Nylund | |
| 5,384,814 A | 1/1995 | Matzner et al. | |
| 5,483,564 A | 1/1996 | Matzner et al. | |
| 5,488,634 A | 1/1996 | Johansson et al. | |
| 5,490,185 A | 2/1996 | Dent et al. | |
| 5,610,961 A | 3/1997 | Dunlap et al. | |
| 5,627,866 A | 5/1997 | Dunlap et al. | |
| 5,748,695 A | 5/1998 | Dunlap et al. | |
| 5,793,636 A | 8/1998 | Cooney et al. | |
| 5,923,717 A | 7/1999 | Fawks, Jr. | |
| 5,960,051 A | 9/1999 | Challberg et al. | |
| 6,229,868 B1 * | 5/2001 | Nylund et al. | 376/433 |
| 6,251,499 B1 * | 6/2001 | Lehman et al. | 428/182 |
| 6,338,149 B1 | 1/2002 | Ciccone, Jr. et al. | |
| 6,504,889 B1 | 1/2003 | Narita et al. | |
| 6,674,825 B2 | 1/2004 | Bolger et al. | |
| 6,690,758 B1 | 2/2004 | Elkins | |
| 6,721,383 B2 | 4/2004 | Casillas et al. | |
| 7,149,272 B2 * | 12/2006 | Soderlund et al. | 376/310 |
| 2003/0116871 A1 * | 6/2003 | Ringo et al. | 261/94 |
| 2004/0013220 A1 | 1/2004 | Casillas et al. | |
| 2004/0013221 A1 | 1/2004 | Elkins | |
| 2004/0071253 A1 | 4/2004 | McFetridge | |
| 2004/0099970 A1 * | 5/2004 | Zich et al. | 261/114.5 |

(Continued)

FOREIGN PATENT DOCUMENTS

EP     0 455 010     3/1995

(Continued)

OTHER PUBLICATIONS

Office Action for corresponding Japanese Application No. 2005-367367 dated Nov. 22, 2011 and English translation thereof.

*Primary Examiner* — Krishnan S Menon
(74) *Attorney, Agent, or Firm* — Harness, Dickey & Pierce, P.L.C.

(57) ABSTRACT

A debris filter for reactor coolant includes a plurality of adjacent plates defining a plurality of channels therebetween, each of said channels being at an angle to the flow path of the coolant into the filter.

9 Claims, 8 Drawing Sheets

U.S. PATENT DOCUMENTS

2004/0135270 A1 * 7/2004 Lantz et al. .................... 261/94
2004/0236544 A1   11/2004 Russell, II et al.

FOREIGN PATENT DOCUMENTS

| | | |
|---|---|---|
| EP | 0 432 738 | 2/1996 |
| EP | 0 710 961 | 5/1996 |
| JP | 4-230892 | 8/1992 |
| JP | 8-105988 | 4/1996 |
| JP | 8-240680 | 9/1996 |

* cited by examiner

DEBRIS FILTER

FIELD OF THE INVENTION

The present invention relates to a nuclear reactor core and more specifically relates to a debris filter for coolant entering the core of a nuclear reactor.

DESCRIPTION OF RELATED ART

In a nuclear reactor, a liquid coolant or moderator flows into the reactor core from the bottom and exits the core as a water/steam mixture from the top. The core includes a plurality of fuel bundles arranged in vertical side-by-side relation, each containing a plurality of fuel rods. The fuel bundles are each supported between an upper tie plate and a lower tie plate. The lower tie plate typically includes an upper grid, a lower inlet nozzle and a transition region between the inlet nozzle and the grid whereby coolant water entering the inlet nozzle flows through the transition region and through the grid generally upwardly and about the individual fuel rods of the fuel bundle supported by the lower tie plate.

Over time, debris accumulates in the reactor and can result in fuel bundle failures in the field by debris fretting through the fuel rod cladding. Such debris can include, for example, extraneous materials left over from reactor construction and various other materials employed during outages and repairs. The coolant moderator circulation system in a nuclear reactor is closed and debris accumulates over time with increasing age and use of the reactor. Many and various types of debris filters or catchers have been proposed and used in the past. One such system employs a series of curved plates extending substantially parallel to the direction of coolant flow interspersed with the webs and bosses of the lower tie plate grid to filter debris. While certain advantages accrue to this type of debris catcher, the various parts are difficult to manufacture and require complex assembly. Another type of debris filter uses a stacked wire concept perpendicular to the coolant flow. While this is effective in filtering out debris, the wires of the debris filter themselves have been known to generate debris, resulting in fuel bundle failures.

In other cases, reactor debris filters are cast integrally with the lower tie plate. The hole size and small ligament web between the holes, however, are very near the investment casting manufacturability limits and oftentimes require hand rework to produce the filter. Particularly, an integral cast plate containing multiple holes extending parallel to the direction of coolant flow at the bottom of the boss/web structure of the lower tie plate grid supporting the fuel rods has been employed as a debris filter. While this design is simple and robust and does not add additional piece parts to the lower tie plate, any reduction in size of the debris filtering holes would render the lower tie plate very difficult to cast.

SUMMARY OF THE INVENTION

The various embodiments of the present invention provide a debris filter for filtering coolant entering the core of a nuclear reactor. The inventors hereof have designed a debris filter that provides, in various embodiments, for improved effectiveness in filtering debris, while simultaneously improving its manufacturability and assembly. Additionally, in some embodiments of the invention, the debris filter improves filtering effectiveness without substantially increasing the pressure drop and/or decreasing the pressure drop of the fluid flow in the lower tie plate assembly to enable flexibility in the overall fine-tuning of the bundle thermal hydraulic design.

According to one aspect of the invention, a debris filter for reactor coolant includes a plurality of adjacent plates defining a plurality of channels therebetween, each of said channels being at an angle to a flow path of the coolant into the filter.

According to another aspect of the invention, a multistage filter for reactor coolant including a first filter with a plurality of adjacent plates defining a plurality of first channels therebetween. Each of said first channels are at an angle to a flow path of the coolant into the first filter. A second filter includes a plurality of adjacent second plates defining a plurality of second channels therebetween. Each of the second channels are at an angle to the flow of the coolant from the first filter.

According to yet another aspect of the invention, a multistage filter for reactor coolant including a first filter with a plurality of adjacent plates defining a plurality of first channels therebetween. A second filter includes a plurality of adjacent second plates defining a plurality of second channels therebetween. Each second channel of the second filter is aligned to multiple first channels of the first filter.

Further aspects of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The exemplary embodiments of the present invention will become more fully understood from the detailed description given herein below and the accompanying drawings, wherein like corresponding parts are represented by like reference numerals throughout the several views of the drawings, which are given by way of illustration only and thus are not limiting of the exemplary embodiments of the present invention.

DETAILED DESCRIPTION

The following description is merely exemplary in nature and is in not intended to limit the invention, its applications, or uses.

In some embodiments of the invention, a debris filter for reactor coolant includes a plurality of adjacent plates defining a plurality of channels therebetween, each of said channels being at an angle to a flow path of the coolant into the filter. One such exemplary embodiment is illustrated in FIGS. 1A, 2B, and 1C.

Figure 1A:
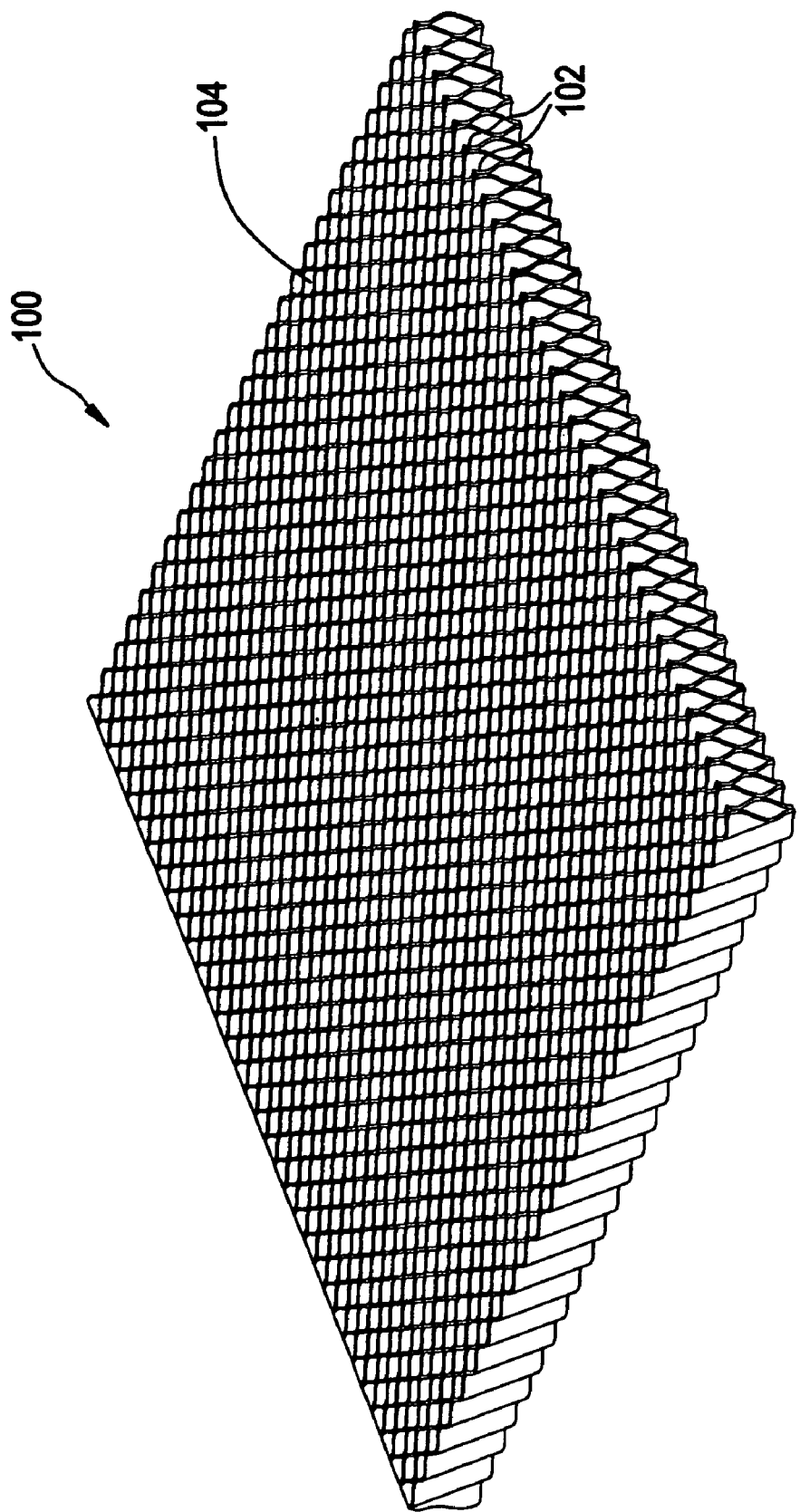
FIG. 1A is a perspective view of a debris filter according to one exemplary embodiment of the invention.
Figure 1B:
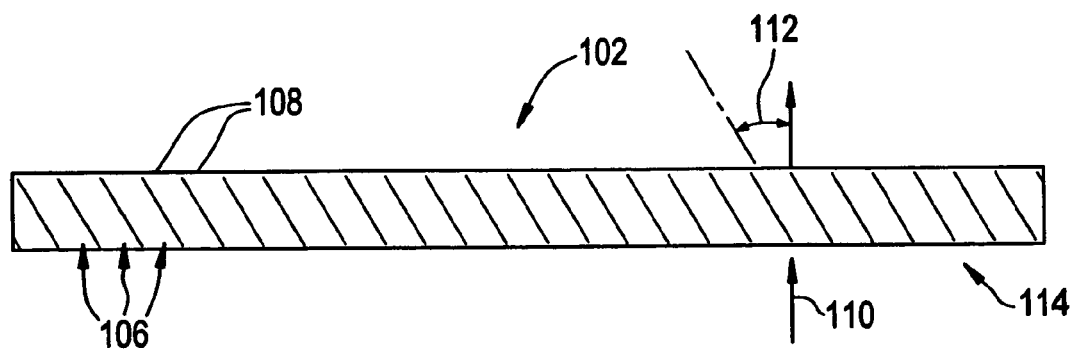
FIG. 1B is a side view of a plate for a debris filter according to another exemplary embodiment of the invention.

Referring to FIG. 1A, a filter 100 includes a plurality of plates 102 defining a plurality of flow channels 104 therebetween. In this illustrated embodiment, the filter 100 is rectangular in shape; however, the filter 100 can be formed in any shape or size adaptable for use within a nuclear reactor. A single plate 102 of the filter 100 is shown in FIG. 1B. Each plate 102 has a plurality of alternating peaks 106 and valleys 108 spaced at a predetermined spacing from one another. The peaks 106 and valleys 108 are configured such that when spaced side by side, on a peak to valley arrangement, the flow channel 104 is defined therebetween. The peaks 106 and valleys 108 may be of any design including a triangular or wave pattern and in some embodiments, plates 102 are corrugated plates. In some embodiments, the peaks 106 and valleys 108 form the channel 104 having a substantially square cross sectional area. In some embodiments, the cross sectional area is less than or equal to about 0.04 inches, and in other embodiments the cross sectional area is greater than or equal to about 0.025 inches.

The peaks 106 and valleys 108 are formed at an angle 112 from a perpendicular path 110 to a lateral surface 114 of the corrugated plate 102. The angle 112 may be any angle, and in one preferred embodiment, angle 112 is greater or equal to about 15 degrees. In another preferred embodiment, angle 112 is less than or equal to about 60 degrees. In typical operation, reactor coolant (not shown) flows to the lateral surface 114 of the plates 102 and generally parallel to perpendicular path 110. As the peaks 106 and valleys 108 are an angle 112 to perpendicular path 110, coolant flowing in channels 104 defined by the peaks 106 and valleys 108 is forced to change flow direction to consistent with the angle 112.

Figure 1C:
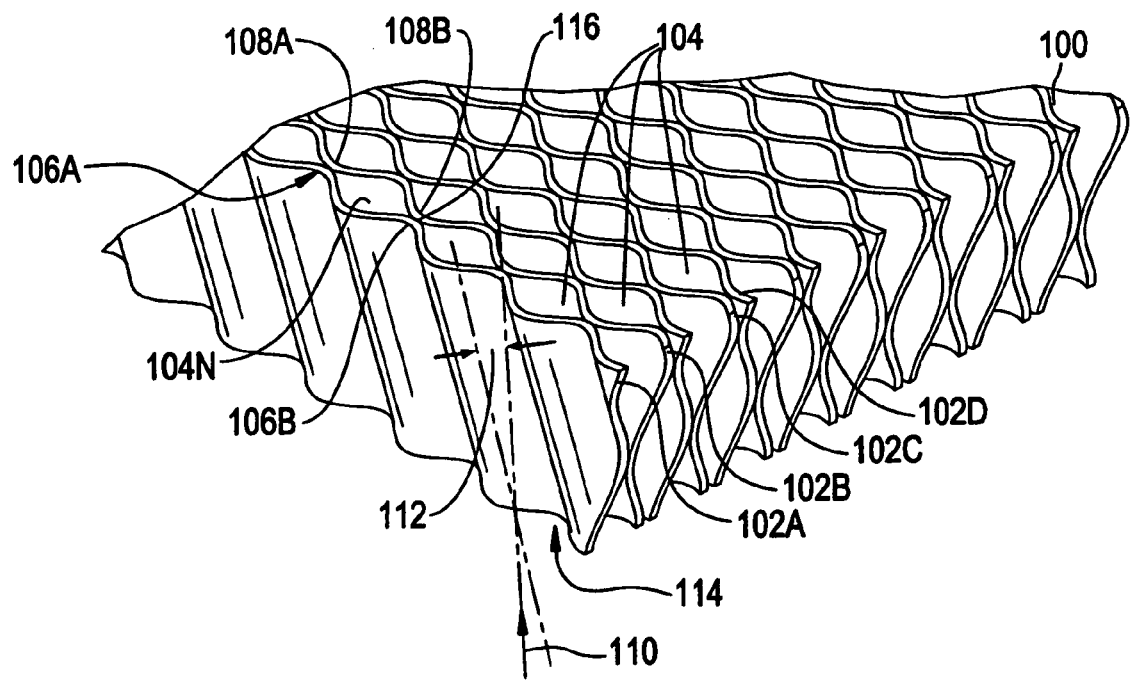
FIG. 1C is a close up perspective view of a debris filter illustrating the plate defining a plurality of flow channels according to another exemplary embodiment of the invention.

This is further shown in FIG. 1C which provides a close-up perspective view of filter plate 100 illustrating the plurality of corrugated plates 102 (see 102 A-D by way of example) that are arranged side by side. Each plate 102 is aligned with its peaks 106 to the valleys 108 of the adjacent plates 102 (for example, plate 102A and plate 102B), to form channels 104 therebetween. As shown, peaks 106A and 106B of plate 102A are aligned to valleys 108A and 108B, respectively, of plate 102B to form channel 104N. In some embodiments, each plate 102 can be attached at some of these peaks 106 and valleys 108 at one or more connecting points 116. These connecting point attachments can be a weld, solder, or any other suitable means for attachment including an attaching filler or adhesive added by way of spraying or dipping. As can be seen from FIG. 1C, a plurality of substantially rectangular or square flow channels 104 are formed by the peaks 106 and valleys 108 of adjacent and connected corrugated plates 102. Additionally, as each plate 102 has the peaks 106 and valleys 108 formed at an angle 112, the channels 104 are positioned at an angle 112 to the perpendicular path 110 to the lateral face 114 of the filter 100. As noted, the perpendicular path 110 is the general direction of coolant or fluid flow into the filter 100 at the lateral face 114. As such, any coolant entering the channels 104 at filter surface 114 will flow through the channel 104 at an angular flow of angle 112 to that of the coolant flow 110 into the filter 100.

In other embodiments of the invention, a multistage filter for reactor coolant includes a first filter with a plurality of adjacent plates defining a plurality of first channels therebetween. Each of said first channels are at an angle to a flow path of the coolant into the first filter. A second filter includes a plurality of adjacent second plates defining a plurality of second channels therebetween. Each of the second channels are at an angle to the flow of the coolant from the first filter.

Figure 2A:
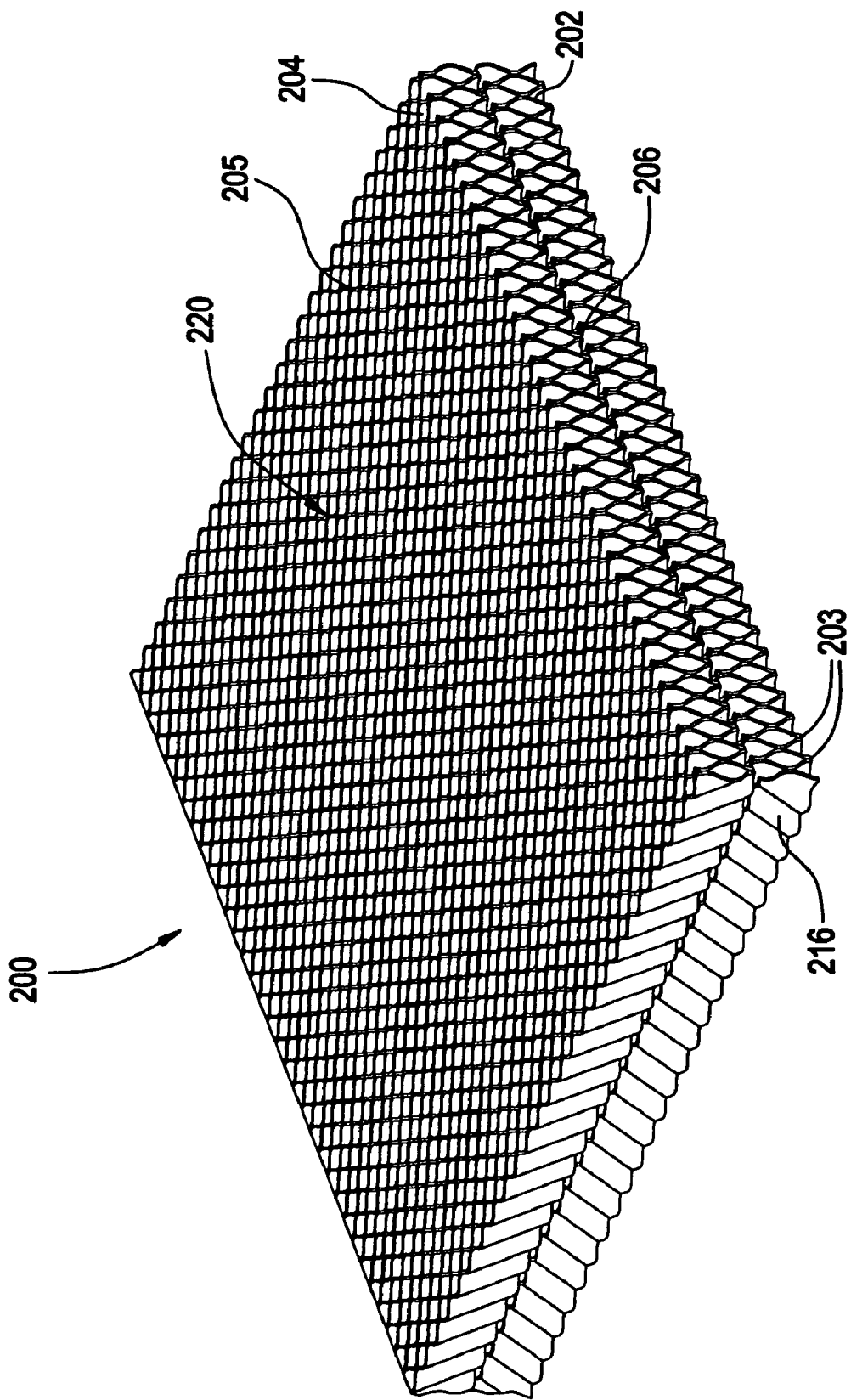
FIG. 2A is a side perspective view of a debris filter having a multi-stage filter according to another exemplary embodiment of the invention.
Figure 2B:
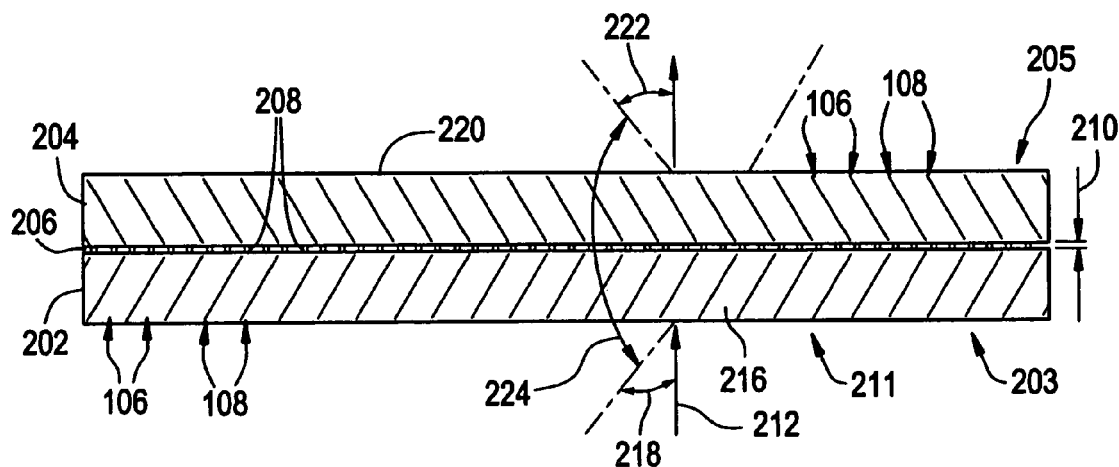
FIG. 2B is a perspective view of a multi-sage debris filter having first and second filter according to another exemplary embodiment of the invention.
Figure 2C:
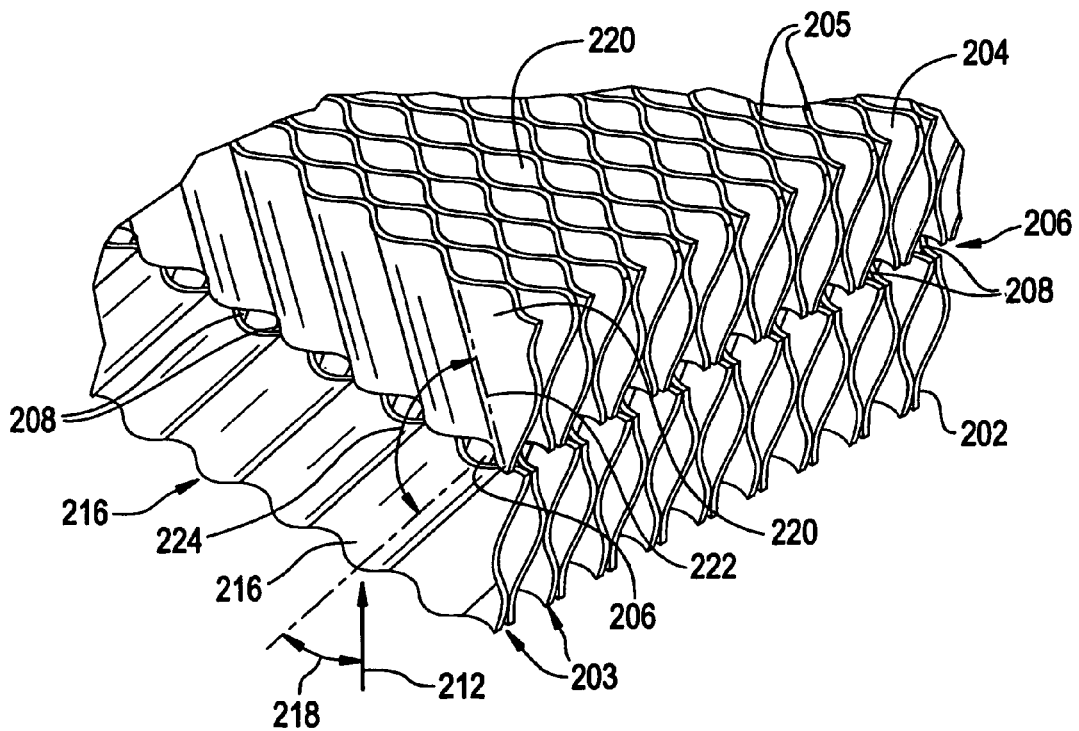
FIG. 2C is a close up perspective view of a multi-stage debris filter having first and second filters according to another exemplary embodiment of the invention.

Some exemplary embodiments of are illustrated in FIGS. 2A, 2B, and 2C of a filter 200 for a reactor coolant having a multi-stage filter arrangement with at least a first filter 202 and a second filter 204. In FIG. 1A, the second filter 204 is positioned adjacent to the first filter 202. In other embodiments, additional filters can also include in such a multi-stage filter. Both the first filter 202 and the second filter 204 can have a plurality of flow channels 216 and 220 defined between a plurality of plates, 203 and 205, respectively. As shown, the first filter 202 includes a plurality of first plates 203 defining a plurality of first channels 216. The second filter 204 has a plurality of second plates 205 defining a plurality of second channels 220. One such embodiment for each of filter 202 and 204 is described above in reference to FIGS. 1A, 1B, and 1C. However, other embodiments are also within the scope of the invention.

In some embodiments the second filter 204 is position directly adjacent to first filter 202. In other embodiments the second filter 204 is spaced at a distance from the first filter 202 thereby by defining an intermediate zone 206 or gap therebetween. FIG. 2B illustrates an exemplary side view of the two side by side filters. As shown, the first filter 202 includes a surface 211 for receiving a flow of coolant (not shown). The first filter 202 includes a plurality of alternating peaks 106 and valleys 108 that are formed at an angle 218 to a perpendicular path 212 to surface 211.

The second filter 204 of the multi-stage filter 200 also includes a plurality of alternating peaks 106 and valleys 108. The second filter 204 is positioned adjacent to or side-by-side with the first filter 202 and can be separated by the intermediate zone 206. In such an embodiment, a plurality of connecting members 208 can be coupled to the first filter 202 and the second filter 204 and can fixedly couple the two filters 202 and 204 together thereby defining the intermediate zone having a gap or spacing 210. The peaks 106 and valleys 108 of the second filter 204 are positioned at a second angle 224 from the first angle 218. The second angle 224 can be, in some embodiments, less than or equal to 150 degrees. In another embodiment, the peaks 106 and valleys 108 of the second filter 204 can be a third angle 222 which is also defined from the perpendicular path 212. In such embodiments, the third angle 222 can be an angle that is in an opposite direction of the perpendicular path 212 than the first angle 218 of the peaks 106 and valleys 108 of the first filter. In one embodiment, the third angle 222 is equal in magnitude but opposite in sign with respect to the perpendicular path 212 as the first angle 218 of the first filter 202.

As shown in the close up perspective view of FIG. 2C, the first filter 202 and the second filter 204 are positioned side by side such that flow through the first channels 216 of the first filter 202 flow into the second channels 220 of the second filter 204. As described above, with the second angle 224 being less than or equal to 150 degrees from the first angle 218, coolant flowing into the first filter 202 flows at the first angle 218 from the perpendicular flow 212 of coolant into the first filter 202. The coolant then changes directions as the coolant flows from the first flow channels 216 into the second channels 220, e.g., changes directions equal to the second angle 224.

In FIG. 2C, it can also be shown that in some embodiments, the first flow channels 216 of the first filter 202 can interconnect with the second flow channels 220 of the second filter 204 on a one-to-one basis. In other embodiments, the peaks 106 of the first filter 202 can be aligned to the valleys 108 of the second filter 204. In some such embodiments, the first channels 216 provide coolant flow to a plurality of second channels 220. In other embodiments, the second flow channels 220 are aligned with the first flow channels 216 such that each second channel 220 is aligned to four or more first channels 216. In such embodiments, the coolant flow in the second channels 220 includes coolant received from four or more first channels 216. In some embodiments, about each ¼ of each second channel 220 is aligned with a different first channel 216.

As mentioned, the connecting members 208 can couple the first filter 202 and the second filter 204 together and can define the intermediate zone 206 between the two filters 202 and 204. The intermediate zone 206 can define the spacing 210 between the two filters 202 and 204, and in some embodiments, the spacing is about 0.04 inches. In other embodiments, the spacing 210 is less than or equal to 0.05 inches. In embodiments with the intermediate zone 206, the intermediate zone 206 provides for a mixing of flow from a plurality of first channels 216 being provided to each second channel 220. This also provides the multi-stage filter 200 with improved filtering characteristics. Various embodiments can include one or more of a) trapping debris with the multi-stage filter 200, b) trapping debris within the intermediate zone 206, and c) providing fluid flow around any trapped debris. Of course, other features or characteristics of the filter are also present although not described or particularly pointed out herein.

As discussed above, the alignment of the second filter 204 with the first filter 202 align the first channels 216 with one or more second channels 220. By way of example, some embodiments of a multistage filter for reactor coolant include a first filter 202 with the plurality of adjacent plates 203 defining the plurality of first channels 216 therebetween. The second filter 204 includes the plurality of adjacent second plates 205 defining a plurality of second channels 220 therebetween. Each second channel 220 of the second filter 204 is aligned to the multiple first channels 216 of the first filter 202. One such embodiment is shown in a close up perspective of FIG. 3.

Figure 3:
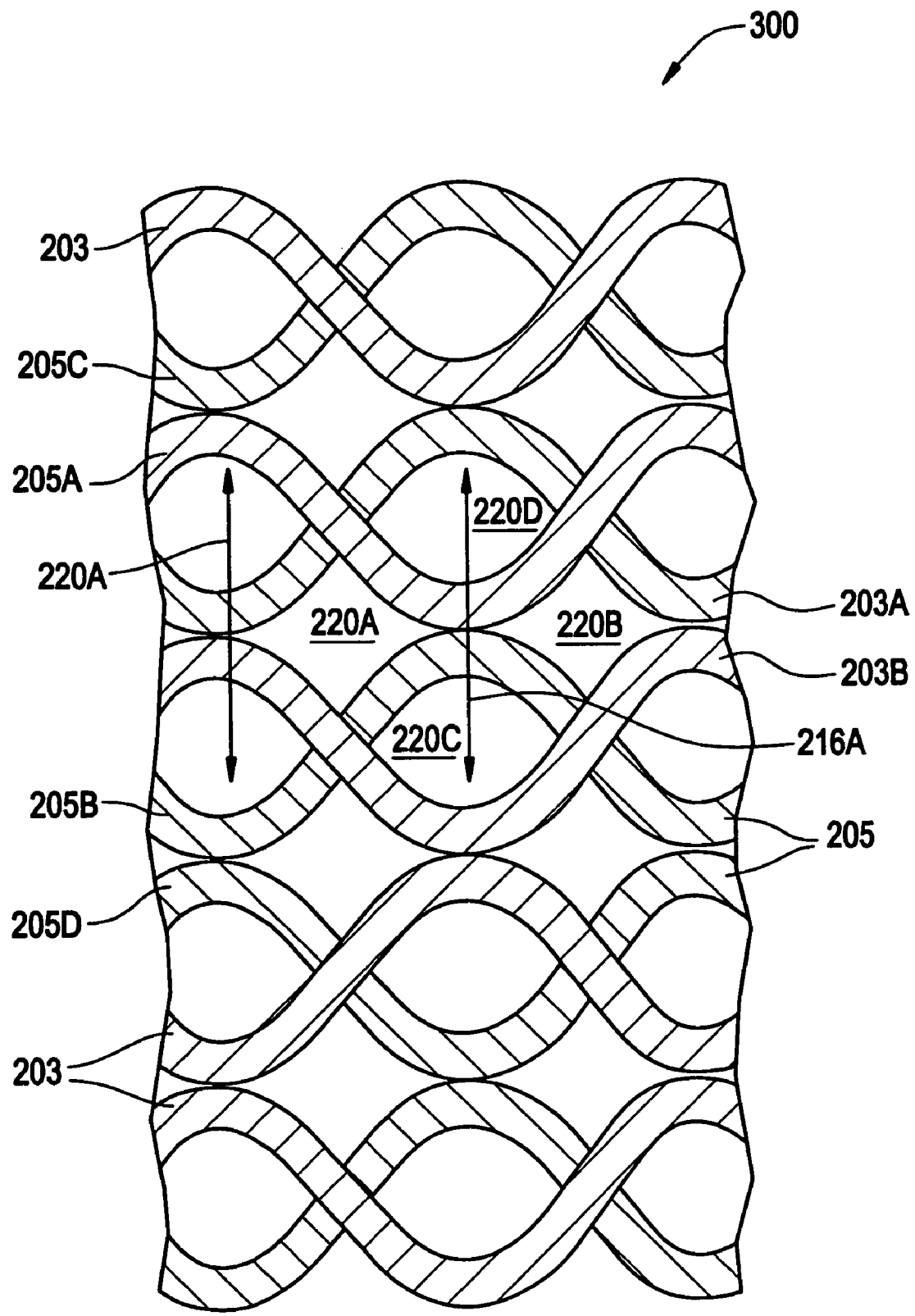
FIG. 3 is a cross sectional view of first and second flow channels for a debris filter according to another exemplary embodiment of the invention.

In the illustrated example of FIG. 3 are a first filter 202 with first plates 203 and a second filter 204 with second plates 205. As can be seen, each peak of the first plates 203 are aligned with a valley of an adjacent plate thereby forming first channel 216 therebetween. For example, a plate 203A is aligned with a plate 203B and a first channel 216A is therebetween defined. Similarly, a plate 205A of second filter 204 defines a plurality of second channels 220 with an adjacent second plate 205B. For example, in FIG. 3 second plate 205A and second plate 205B form second channels 220A and 220B, second plate 205A and second plate 205C form another second channel 220D, and second plate 205B and second plate 205D form another second channel 220C.

The first filter 202 made up of first plates 203 that define the first channels 216 is aligned the second filter 204 made up of second plates 205 that define the second channels 220, in this exemplary embodiment, such that multiple second channels 220 are aligned to each first channel 216. As shown, the first channel 216A is aligned to each of second channels 220A, 220B, 220C and 220D. In such an arrangement, coolant flows through each of the first channel 216 and is distributed and provided to multiple second channels 220, and in this example, to four second channels 220. In other embodiments, each first channel 216 can be aligned to two or more second channels 220. Additionally, in other embodiments and as discussed above an intermediate zone 206 may provide for additional mixing of coolant flow from first channels 216 to second channels 220.

In operation, debris filters according to the various embodiments of the invention described herein are adapted for filtering debris in the coolant circulating within a nuclear reactor. As such, other embodiments of the invention include a lower tie plate assembly for a nuclear reactor that includes a casing having an inlet opening for conducting coolant into the lower tie plate assembly. A rod support member is configured for receiving a plurality of fuel rods. A debris filter is positioned adjacent to the rod support member. Various embodiments of the debris filter, as discussed above and by way of the above examples, can be utilized in such a lower tie plate assembly. For example, in some embodiments the debris filter can include at least a first filter and a second filter. The first filter can have a plurality of adjacent plates defining a plurality of first channels therebetween. Each of the first channels is at an angle to a flow path of the coolant into the first filter. The second filter can have a plurality of adjacent plates that define a plurality of second channels therebetween. Each of the second channels is at an angle to the flow of the coolant from the first filter. The second channels of the second filter can be offset from the first channels of the first filter such that the coolant flow in each second channel includes coolant flow from multiple first channels. Each of the first channels and the second channels can have a cross section less than or equal to about 0.04 square inches in some preferred embodiments. Such flow channels cross sections can be of any shape and in one embodiment is substantially square in shape.

In some embodiments, a plurality of connecting members coupling the second filter to the first filter to create a substantially unobstructed intermediate zone between the first filter and the second filter. In other embodiment, an angle of the first channels is greater than or equal to about 15 degrees from a coolant flow entering the first filter. Additionally, the angle of the second channels is less than or equal to about 150 degrees from the coolant flow from the first filter.

The casing can be dimensioned to provide a higher flow rate in a center portion of the filter than a flow rate along a perimeter portion of the filter. In such cases, the flow rate arrangement provides for washing filtered debris from the center of the multi-stage filter into the corners of the casing between the casing and the multi-stage filter. The casing can also be configured to include a filter placement opening that is adapted for insertion of the multi-stage filter into the casing adjacent to the rod support member and a closure plate. The multi-stage filter can generally be dimensioned to substantially fill the casing such that substantially all of the coolant flows through both the first filter and the second filter.

Figure 4:
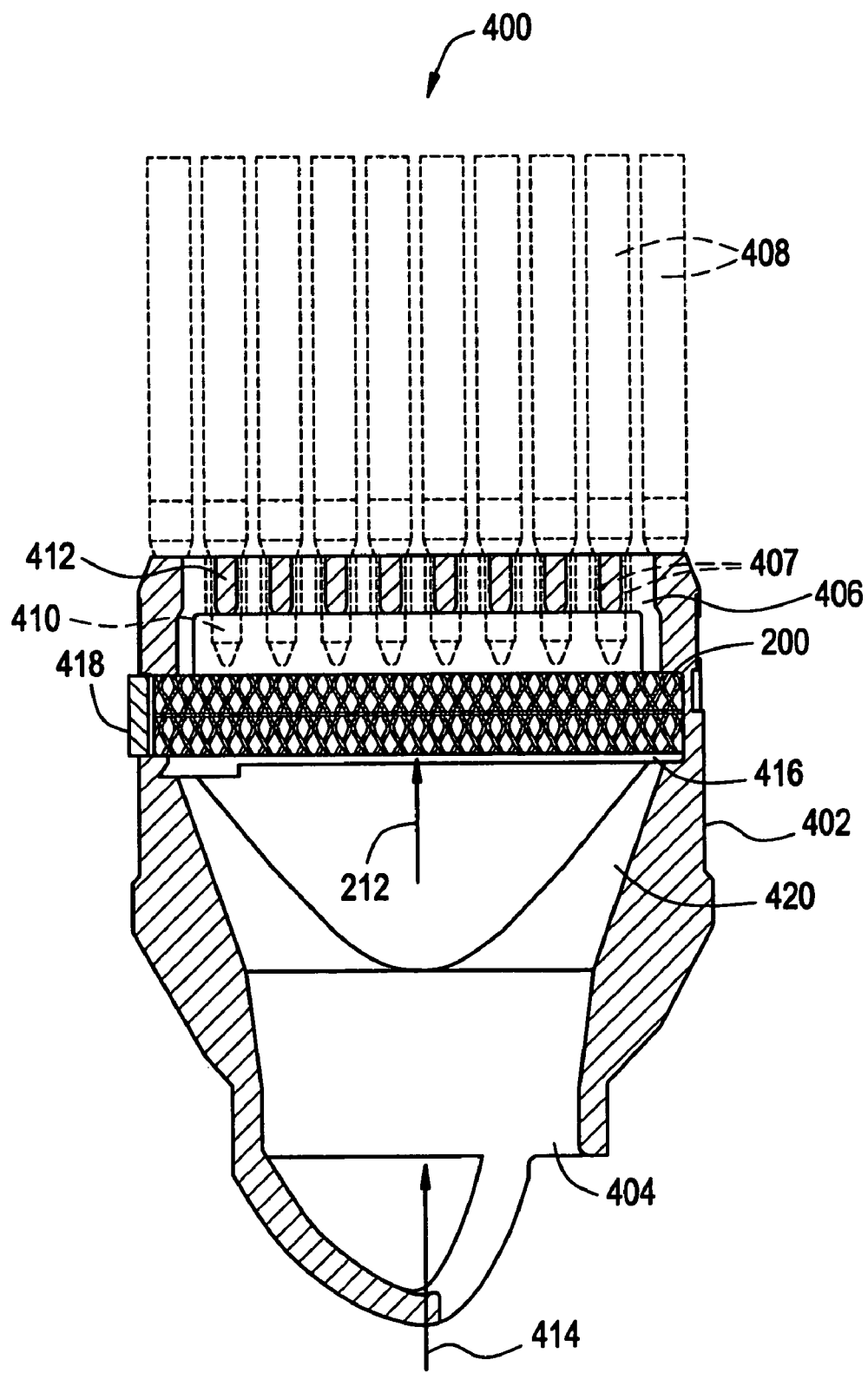
FIG. 4 is a cross sectional view of how a lower tie plate is assembled with a separate debris filter and cover plate according to another exemplary embodiment of the invention.
Figure 5:
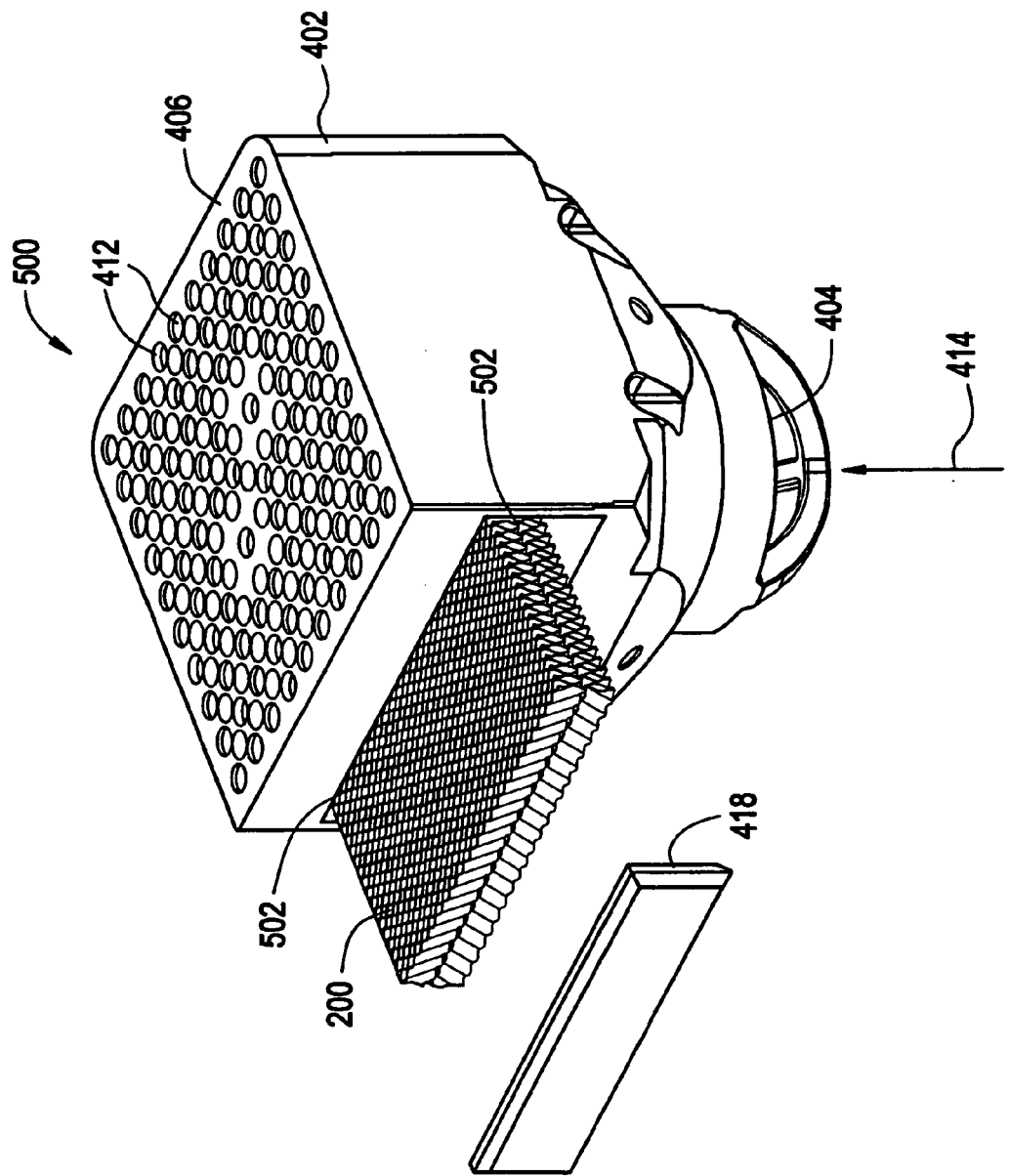
FIG. 5 is an illustration is a perspective view of a lower tie plate assembly according to another exemplary embodiment of the invention.

Two such exemplary embodiments are illustrated in FIGS. 4 and 5. Referring first to FIG. 4, a lower tie plate assembly 400 for a nuclear reactor is illustrated with a plurality of fuel rods 408 coupled thereto. The lower tie plate assembly 400 includes a lower tie plate casing 402 defining an inlet opening 404 and a flow chamber 420. Coolant flows as shown as 414 into the reactor core through this inlet 404 and chamber 420. A rod support member 406 includes rod holes 412 for receiving and supporting the plurality of fuel rods 408, which may include non-fuel rods such as water rods. Some of the fuel rods 408 can have end caps 410 for attaching the fuel rods to the rod support member 406. The rod support member 406 can also include a plurality of openings 407 to allow for the passage of coolant from below the rod support member 406 up to and around the fuel rods 408. A filter cover plate 418 can provide access to the filter 200 and can be adjacent to rod support member 406. In some embodiments, the filter cover plate 418 and/or lower end plate casing 402 can be adapted to support or fixedly couple the filter 200 into a position adjacent the rod support member 406.

As illustrated, the filter 200 receives coolant flow 414 from inlet 404 through chamber 420. The coolant entering the filter 200 can be substantially parallel to perpendicular path 212. The coolant flow through the filter 200 and directly into the lower portion of the rod support member 406 and up and through the rod support member 406 to the fuel rods 408.

The lower tie plate casing 402 can be configured to provide a higher flow rate of coolant near the center portion of the filter 200 and a lower flow rate at or near the perimeter of the filter 200. As such, at least a portion of the debris in the coolant filtered by the filter 200 can be forced by the difference in flow rates and associated pressures to one or more of the corners 416 of the chamber 420.

Referring now to FIG. 5, a lower tie plate assembly 500 is exploded to illustrate the separate parts according to one embodiment of the invention. In this exemplary embodiment, the casing 402 defines a filter access opening 502 for receiving the filter 200 into the casing 402. After the filter 200 is inserted into the filter access opening 502 of casing 402, the filter cover plate 418 closes the opening 502. Typically, the filter cover plate 418 is welded or otherwise fixedly attached to seal the lower tie plate casing 402.

In another embodiment, a fuel assembly for a boiling coolant reactor includes a lower tie plate with a rod support member and an upper tie plate. A plurality of fuel rods extend between the upper tie plate and the lower tie plate. A casing surrounds the lower tie plate, the upper tie plate, and the fuel rods and defines an inlet opening through the lower tie plate assembly for conducting coolant into a reactor core. A debris filter is position positioned adjacent to the rod support member.

In some embodiments, the debris filter is one of the debris filters described above, by way of example. In one embodiment, the filter includes a first filter, a second filter, and a plurality of connecting members. The first filter has a plurality of first plates defining a plurality of first flow channels. Each of the first flow channels are at a first angle to a flow path of the coolant into the first filter. The second filter has a plurality of second plates defining a plurality of second flow channels. Each of the second flow channels is at a second angle to the flow of the coolant into the first filter. The second angle is in an opposite direction to the first angle. Each of the second flow channels can be offset from each of the first flow channels. The connecting members can fixedly connect the second filter to the first filter and can create an intermediate zone therebetween. In one embodiment, the intermediate zone is substantially unobstructed.

Figure 6:
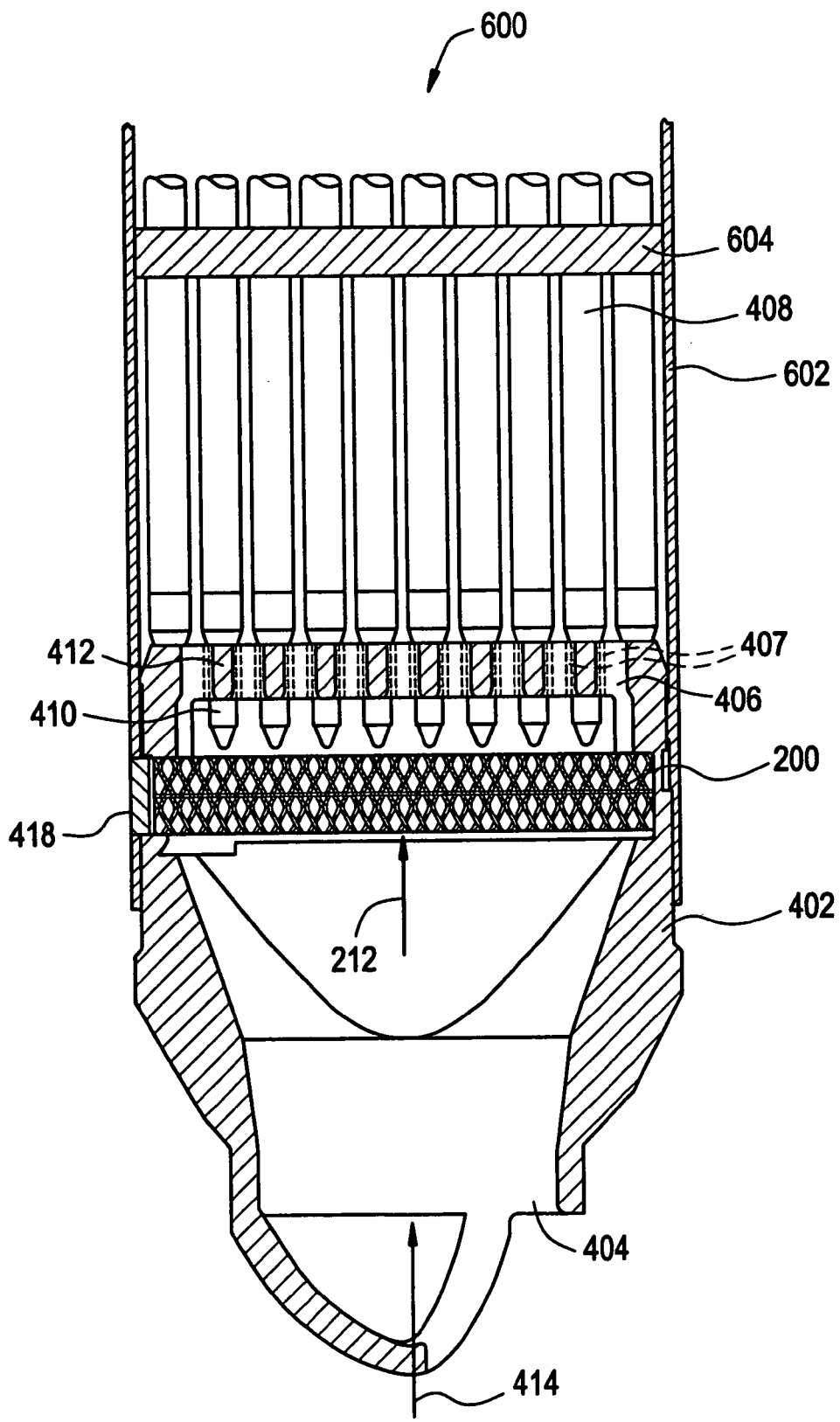
FIG. 6 is a cross sectional view of a fuel assembly for a reactor according to another exemplary embodiment of the invention.

One example of such a portion of a nuclear reactor fuel assembly is shown in FIG. 6. In this example, a partial fuel assembly 600 includes a lower tie casing 402 that includes a coolant inlet 404 and a rod support member 406. The rod support member 406 includes rod holes 412 for receiving a plurality of fuel rods 408. A filter 200 is positioned adjacent to the rod support member 406 and a filter cover plate 418. The filter 200 can be any embodiment of the filter described above and herein.

One or more spacers 604 supports and spaces the upper portions of the fuel rods 408. A fuel assembly casing 602 can surround the fuel rods 408, the spacers 604, the rod support member 406, the lower tie plate casing 402, and an upper tie plate (not shown).

When introducing aspects of the invention or embodiments thereof, the articles "a", "an", "the", and "said" are intended to mean that there are one or more of the elements. The terms "comprising", "including", and "having" are intended to be inclusive and mean that there may be additional elements other than the listed elements.

In view of the above, it will be seen that several aspects of the invention are achieved and other advantageous results attained. As various changes could be made in the above exemplary constructions and methods without departing from the scope of the invention, it is intended that all matter contained in the above description or shown in the accompanying drawings shall be interpreted as illustrative and not in a limiting sense.

It is further to be understood that the steps described herein are not to be construed as necessarily requiring their performance in the particular order discussed or illustrated. It is also to be understood that additional or alternative steps may be employed.

What is claimed is:

1. A fuel assembly for a nuclear reactor, comprising:
at least one fuel rod; and
a lower tie casting configured to receive the at least one fuel rod, the lower tie casting including,
a coolant inlet configured to permit a fluid coolant to flow into and through the assembly, and
a first filter having a plurality of adjacent plates, each of the plurality of plates having a plurality of alternating peaks and valleys, the peaks of a first plate of the plurality of adjacent plates and the valleys of a second adjacent plate of the plurality of adjacent plates being aligned in parallel such that each peak of the first plate and associated valley of the second plate define a closed channel, said channels being at an angle to a flow path of the coolant inlet, the first filter being shaped and positioned in the lower tie casting such that the coolant from the flow path enters the channels of the first filter, flows at the angle of the channels of the first filter, does not flow between the channels of the first filter, and flows through the at least one fuel rod after exiting the first filter.

2. The fuel assembly of claim 1, wherein the lower tie casting further includes a second filter adjacent to the first filter in the direction of the flow path, the second filter having a plurality of adjacent second plates, each of the plurality of plates having a plurality of alternating peaks and valleys, the peaks of a first plate of the plurality of adjacent plates in the second filter and the valleys of a second adjacent plate of the plurality of adjacent plates in the second filter being aligned in parallel such that each peak of the first plate and associated valley of the second plate define a closed channel, said channels being at an angle to the flow of the coolant from the first filter, the second filter being shaped and positioned in the lower tie casting such that the coolant from the first filter enters the channels of the second filter, flows at the angle of the channels of the second filter, does not flow between the channels of the second filter, and flows through the at least one fuel rod after exiting the second filter.

3. The fuel assembly of claim 2 wherein the channels of the second filter are offset from the channels of the first filter such that the coolant flow in each second channel includes coolant from multiple first channels.

4. The fuel assembly of claim 2 wherein each first filter channel is aligned to four or more second filter channels such that about each ¼ of each second filter channel cross sectional area is aligned to four different first filter channels.

5. The fuel assembly of claim 2, further comprising a plurality of connecting members for fixedly connecting the second filter to the first filter and creating a substantially unobstructed intermediate zone therebetween.

6. The fuel assembly of claim 2 wherein the second filter is spaced from the first filter by about 0.04 inches.

7. The fuel assembly of claim 2 wherein a peak of the first plate of the first filter is aligned to a valley of the second plate of the second filter.

8. The fuel assembly of claim 2 wherein the angle of the first channels is greater than or equal to about 15 degrees from a coolant flow entering the first filter and the angle of the second channels is greater than or equal to about 150 degrees from the coolant flow entering from the first filter, said first filter angle and said second filter angle being of opposite sign.

9. The fuel assembly of claim 2 wherein each first channel and each second channel has a cross section less than or equal to about 0.04 square inches.

* * * * *